June 7, 1938. L. STRELKA 2,119,973
COMBINED DISTILLATOR AND CARBONIZER
Filed Jan. 16, 1936 4 Sheets-Sheet 2

INVENTOR.
Leo Strelka,
BY Charles O. Shervey,
his ATTORNEY.

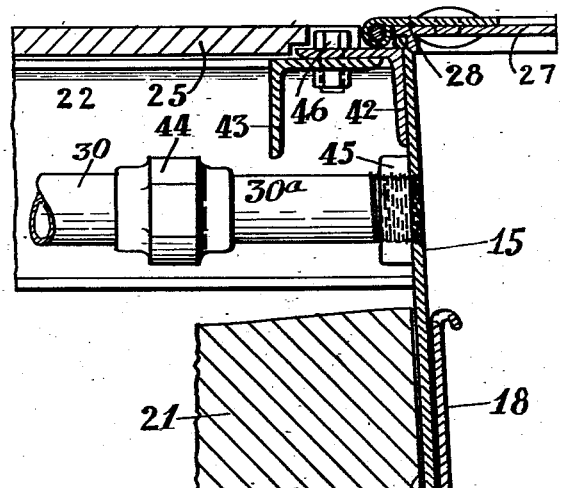
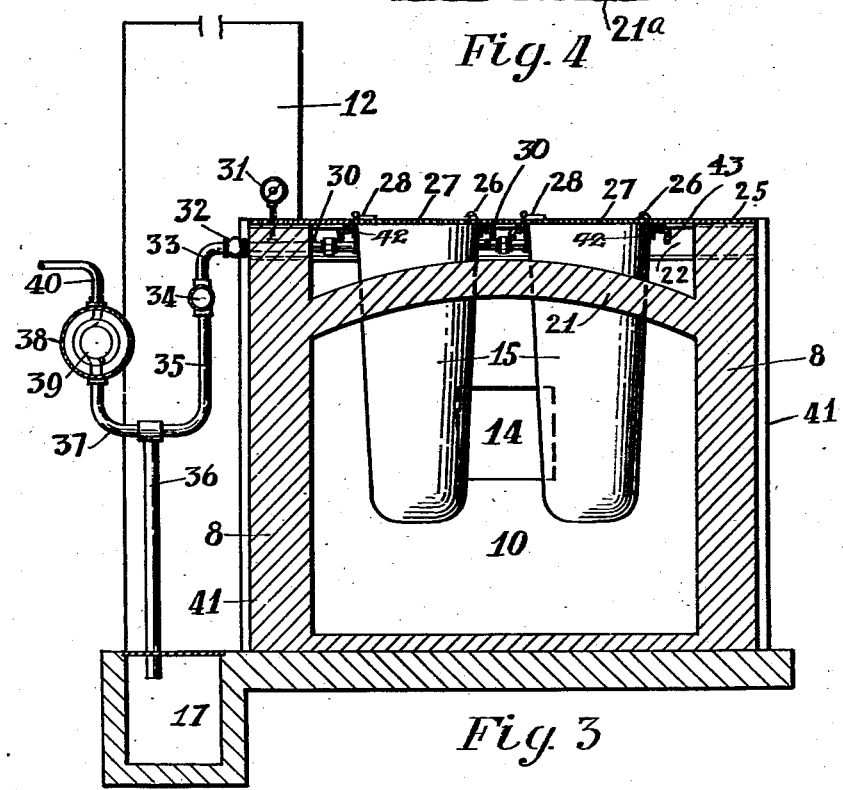

June 7, 1938.　　　　L. STRELKA　　　　2,119,973
COMBINED DISTILLATOR AND CARBONIZER
Filed Jan. 16, 1936　　　4 Sheets-Sheet 4
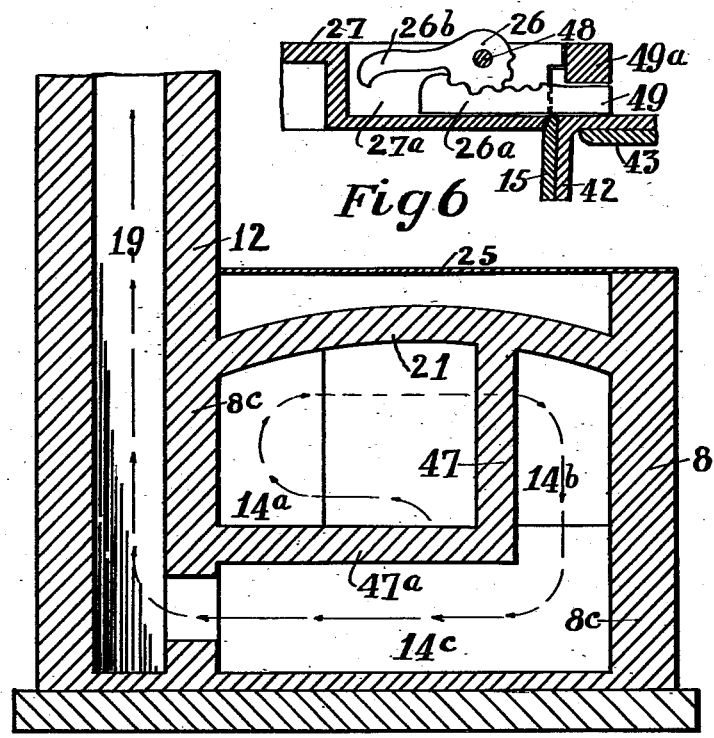
Fig. 6
Fig. 5
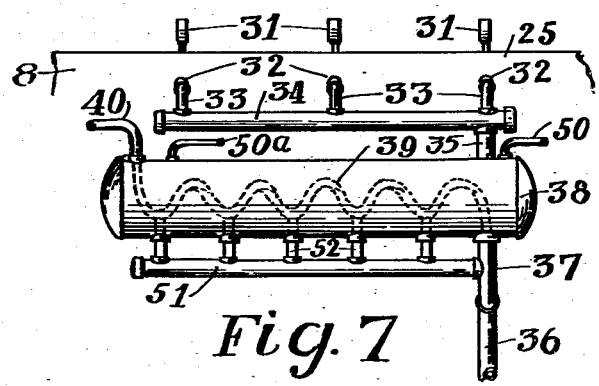
Fig. 7
INVENTOR.
Leo Strelka,
BY
his ATTORNEY.

Patented June 7, 1938

2,119,973

UNITED STATES PATENT OFFICE 2,119,973

COMBINED DISTILLATOR AND CARBONIZER

Leo Strelka, Maywood, Ill.

Application January 16, 1936, Serial No. 59,345

4 Claims. (Cl. 202—114)

This invention relates to combined distillators and carbonizers.

In this invention certain new and useful methods and appliances have been made, to completely dispose of sewage, sludges from activated sewage and sludge from any system of sewage clarification, chemical filtration or levigation and settlement and filtration.

This invention is also intended for the complete disposal of garbage, industrial waste, street dirt, creamery and butter wastes, curds, whey, canning factory wastes, organic wastes of any description, tanbark, hair and lime wastes from tanneries.

This invention consists in means for the complete disposal of waste, organic and combustible matter by a system of distillation, carbonization and final incineration.

The invention consists of a furnace with a deviation channel or breach to the smoke stack, where carbon dust or clinker particles are caused to settle in a chamber to prevent such matter from reaching the atmosphere and causing all odors to pass through the fire, thereby destroying all of the obnoxious gases from the sludges or fermenting organic wastes and making this apparatus odorless, smokeless and dustless.

The invention further consists of a furnace and combustion chamber, in which the combustion chamber is so constructed that any number of retorts may be permanently suspended therein to meet any required amount of waste to be disposed of; each permanent retort being so constructed as to admit of an inner retort, in which the waste is placed for distillation and carbonization, and is removable to allow the carbon produced, to be taken out and used as fuel for the distillation of waste in other retorts and to be disposed of after the gases generated during the period of carbonization have been driven off. Gas generated from the distillation process is used as additional fuel to the carbon in the fire box, by means of a by-pass after filtration and removal of certain impurities. The gas passes off through a piping system from the retorts to a common header, and from thence to a condenser, from which uncondensed gas passes to a filter and is piped to the fire box or stored in a regular gas container, water sealed, for any other use or for sale.

Apparatus embodying this invention is constructed so that the sludge can be destroyed by subjection to the heat of the furnace within the retorts alone, or any mixture of organic waste and sludge combined in varying quantities of either, or garbage can be completely disposed of by itself, or any destructible organic waste placed in the retort can be brought to complete disposal.

The invention further consists in the several novel features of construction, arrangement and combination of parts, hereinafter fully set forth and claimed.

The invention is clearly illustrated in the drawings accompanying this specification, in which:—

Fig. 3 is a cross-section, taken on the line 3—3 of Fig. 1;

Fig. 4 is a detail, fragmental section, taken through the upper end of one of the retorts and associated parts;

Fig. 5 is a cross-section, taken on the line 5—5 of Fig 1;

Fig. 6 is a view, partly in side elevation and partly in vertical section, illustrating one of the locking devices for a certain lid or cover; and Fig. 7 is a side elevation of a condenser used in the apparatus.

Figure 1:
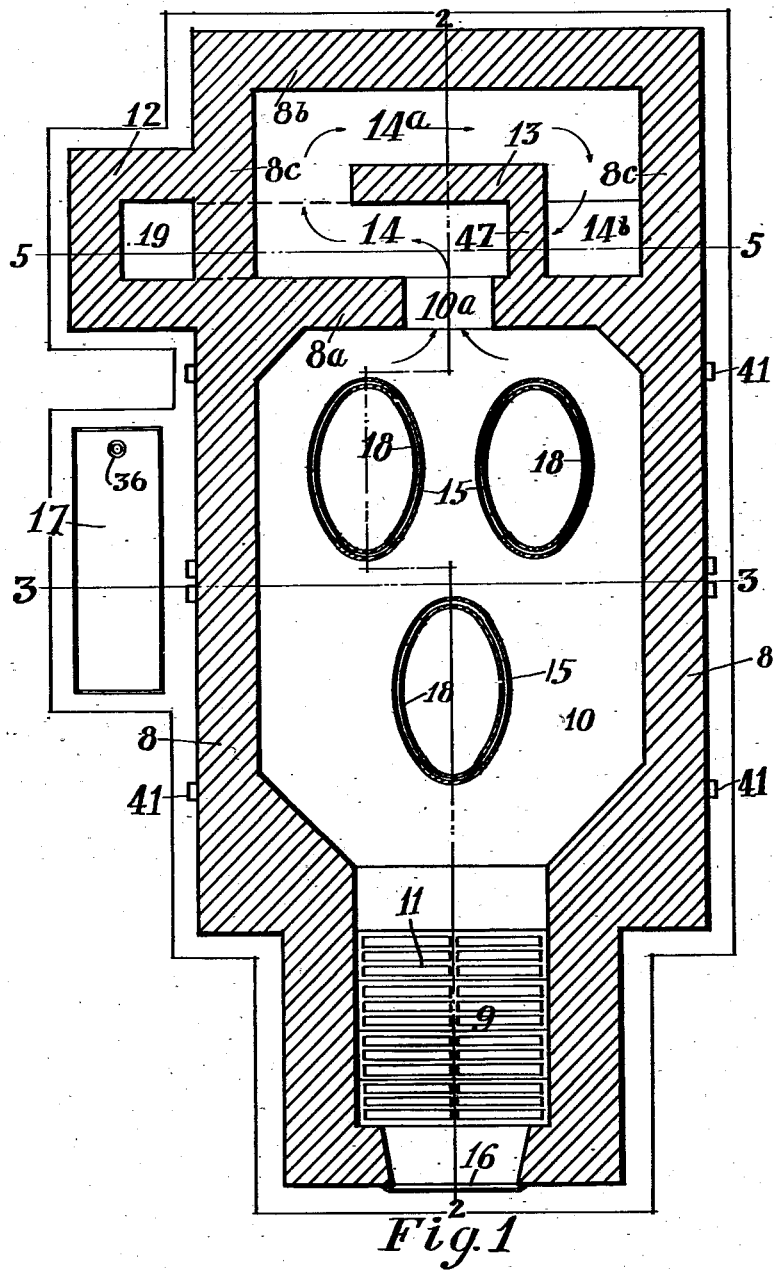
Fig. 1 is a view, partly in plan and partly in horizontal section, of apparatus embodying one form of the invention, the section being taken on the line 1—1 of Fig. 2.
Figure 2:
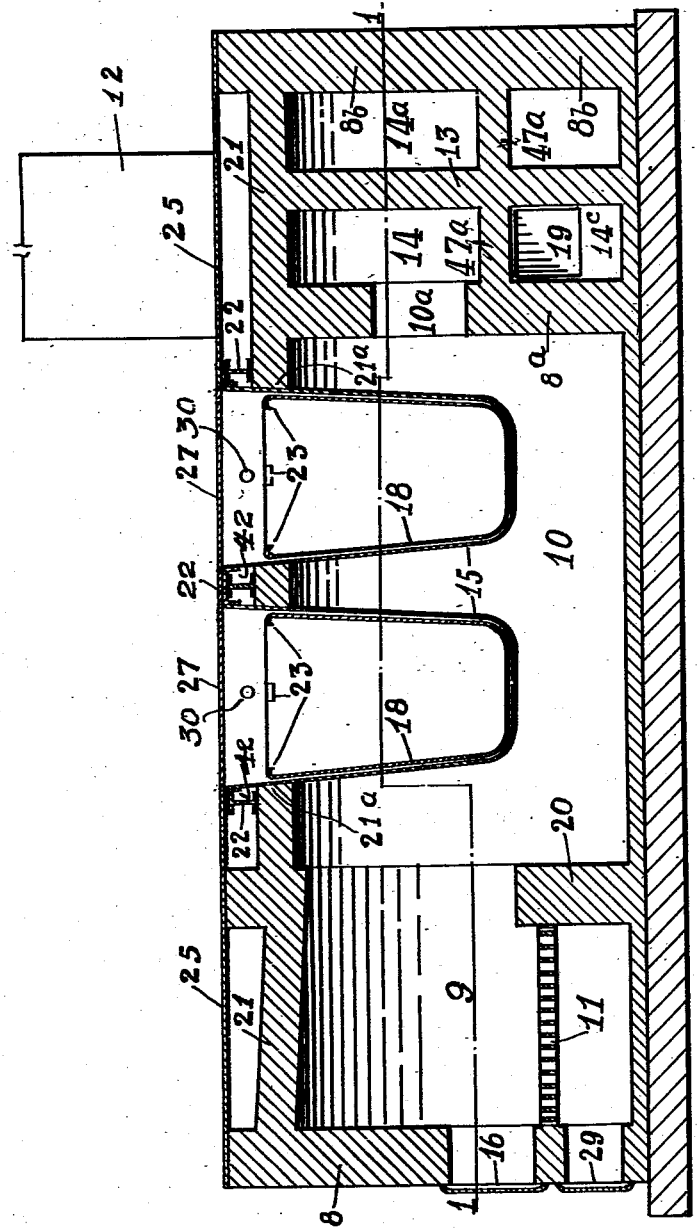
Fig. 2 is a vertical, longitudinal section, taken on the line 2—2 of Fig. 1.

Referring to said drawings, the reference character 8 designates the outer wall of the furnace, which enclosed the fire box 9, the main combustion chamber 10 and the breaching 14. In the fire box are the grate bars 11, and in the end wall of the fire box is a fire door 16 and an ash pit door 29. A retention wall 20 separates the ash pit from the main combustion chamber 10.

An opening 10ª leads from the main combustion chamber to the breaching, and walls 13, 47, 47ª, 8ª, 8ᵇ, 8ᶜ and the roof 21, provide a tortuous passageway indicated by the reference characters 14, 14ª, 14ᵇ and 14ᶜ, which lead around the walls 13, 47, then down underneath the wall 47ª to the flue 19 in the chimney 12, which is located at one side of the furnace. This arrangement provides for the control of the products of combustion and for the settling of carbon, dust, clinkers and other solids. The roof 21 extends over the entire furnace.

In the roof, above the main combustion chamber, are formed several openings 21ª, through which retorts 15 extend into the main combustion chamber. Supported by the side walls 8ᶜ of the furnace, above the roof 21, are structural steel beams 22, desirably in the form of I-beams, that form the supports for the retorts 15. Connecting the I-beams are angle iron bars 43. The I- beams and angle bars are located around the sides of the retorts, and angle iron rings 42 are welded or otherwise permanently fastened to the retorts and rest upon the I-beams 22 and angle iron bars 43, and are fastened thereto by bolts and nuts 46. Desirably, the retorts 15 are oval or round in horizontal cross-section and taper slightly toward their lower ends. They are permanently fastened in place and are removed only in case of repair or replacement. Three retorts are shown, although this number may be increased or decreased, as desired, and they are located in the path which the flames take from the fire box to the breaching. The retorts continuously close the openings in the roof.

Supported upon the furnace structure above the roof thereof, is a metal working floor 25, in which are openings that coincide with the tops of the retorts and provide access thereto. The openings are closed by lids or covers 27, one hinged to the angle iron ring 42 of each retort 15 by a hinge 28 and arranged to fit tightly upon the open top of the retort. A lock bolt 49 (see Fig. 6) is provided for locking each lid down on the retort. The lock bolt is slidably mounted in a recess 27ᵃ, formed in the lid, and engages with an eye 49ᵃ fastened to the angle iron ring 42. The bolt operating means may comprise a gear segment 26, pivotally mounted on the lid, as by a pin 48 and meshing with rack teeth 26ᵃ on the lock bolt. The gear segment has an extension 26ᵇ, which provides a handle whereby the gear segment may be rocked to operate the lock bolt.

Removably contained in the retorts 15 are inner retorts or liners 18, which conform to the shape of the outer retorts and fit fairly well therein. The inner retorts are of less height than the outer ones, thereby leaving clearance spaces in the outer retorts above the inner ones. Means are provided whereby the inner retorts may be removed from and replaced in the outer retorts, and for this purpose hooks 23 are provided at the upper ends of the inner retorts to which may be attached chains, cables or other flexible means that run to a windlass or other lifting apparatus (not shown).

Leading from the clearance space in each outer retort, above the inner one, is a distillate pipe 30 which extends between the working floor 25 and roof of the furnace and runs to a header 34 located at one side of the furnace. Desirably, a threaded flange 45, welded to the outer retort, is provided for connecting the pipe line therewith.

A short nipple 30ᵃ and union coupling 44 provide means for connecting the pipe line with the retort. A gauge 31 may be connected to each distillate pipe for indicating the completion of the distillation process in each retort, and a check valve 32 may be provided in each pipe to enable each retort to be uncovered without any possibility for gases from other retorts backing up into the open one. When the header is located below the pipes 30, elbows 33 connect the pipes with the header.

Leading down from the header is a U-shaped pipe 35, 37, from which leads a pipe 36 that discharges into a closed collection tank 17. Above the joint between the pipe 35, 37 and the pipe 36, is a condenser, in which the gas and vapors, discharged from the retorts, are condensed and from which the condensate is discharged into the closed tank 17 and the uncondensed gases conducted away from the condenser to any desirable place.

The condenser comprises a tank 38 for containing the cooling medium, usually cold water, and a condenser coil 39 in the tank. The pipe 37 connects with one end of the coil 39 and from the other end of the coil a pipe 40 leads to a gas filter (not shown) and conducts away any gases that have not been condensed. Below the condenser is a header 51, which is connected to the lower ends of the several convolutions of the coil by nipples 52, whereby the condensate that forms in the coil flows out therefrom into the header. This header is connected to the pipe 37 and returns the condensate thereto, whereby it may discharge into the collection tank 17. A cold water inlet pipe 50 supplies cold water to the condenser tank, and the outlet pipe 50ᵃ conveys the water therefrom.

In operation, the furnace is started and the inner retorts are filled with garbage, sludge or industrial waste, mixed together or separately, as the case may be, and the lids or covers are closed down and locked. The volatiles are vaporized under the influence of the heat in the furnace and the gases and vapors are driven off through the distillate pipes to the condenser, any liquid, running off through the pipe to the collection tank. The condensible gases and vapors are condensed in the condenser and the condensate runs off through the pipes to the collection tank. Non-condensible gases pass off through the pipe 40 to the filter, or to any other suitable container, and may be used for fuel for the furnace or may be conveyed off in any other desirable manner.

When the material in any retort has been fully reduced, the lid or cover of that retort is opened and the inner retort is removed and the residue which has become fully carbonized is discharged therefrom into a suitable container and the inner retort is then recharged, lowered into the outer retort and the lid closed down and locked tight.

With the use of the permanently located outer retorts and removable inner retorts, the furnace may be kept in continuous operation, because when the inner retorts are removed the openings in the roof remain closed by the other retorts, making it impossible for the hot gases from the furnace to discharge through the openings in the roof. Moreover, by placing the distillate pipes below the working floor, above the roof, no obstructions are left on the floor, thereby enabling the workmen to move freely about on the floor in handling the inner retort when emptying and recharging them.

The carbon which remains in the retorts after complete distillation, may, if desired, be used as fuel in the furnace, and the ashes therefrom may be recovered and treated to produce fertilizer. None of the obnoxious gases and vapors are permitted to escape into the atmosphere, and a complete incineration of the residue after distillation is obtained, whereby a complete destruction of garbage, sludges or other industrial waste is carried on by the apparatus, in addition to reclaiming valuable distillates.

More or less variation of the exact details of construction is possible without departing from the spirit of this invention. I desire, therefore, not to limit myself to the exact form of the construction shown and described, but intend, in the following claims to point out all of the invention disclosed herein.

I claim as new and desire to secure by Letters Patent:

1. Distillation apparatus of the class described, comprising in combination, a furnace having an opening in its roof, an outer retort extending through and above said roof opening and suspended in the furnace, said outer retort having an open top disposed above the roof of the furnace, a cover for said outer retort, a removable inner retort within the outer retort extending from the bottom thereof to the furnace roof and adapted to contain the material to be distilled, and a distillate pipe disposed above the roof leading from that part of the outer retort which is located above the roof.

2. Distillation apparatus of the class described, comprising in combination, a furnace having an opening in its roof, a working platform above the roof having an opening therein disposed above the opening in the furnace roof, an outer retort having a portion contained in the furnace and a portion thereabove, said retort extending down from the opening in the working platform through the opening in the furnace roof and being suspended in the furnace, a cover for said outer retort, a removable inner retort within the outer retort extending from the bottom thereof to the roof and adapted to contain the material to be distilled, and a distillate pipe leading from that part of the outer retort which is located above the furnace roof, said pipe extending through the space between the furnace roof and working platform.

3. Distillation apparatus of the class described, comprising in combination, a furnace having an opening in its roof, a working platform above the roof having an opening therein disposed above the opening in the furnace roof, an outer retort extending down from the opening in the working platform through the space between the furnace roof and platform, and through the opening in the furnace roof and being suspended in the furnace, a cover for said outer retort, a removable inner retort within the outer retort adapted to contain the material to be distilled, said inner retort extending from the bottom of the outer retort to the furnace roof, whereby a clearance space is afforded in the outer retort above the inner retort and the furnace roof, and a distillate pipe leading from said space in the outer retort, and running through the space between the furnace roof and working platform.

4. Distillation apparatus, comprising in combination a furnace having an opening in its roof, supporting beams supported by the furnace adjacent said opening, an outer retort having a flange at its upper end resting upon and secured to said beams, said retort extending through said opening in the roof and being suspended in the furnace, a cover for said retort, an inner retort removably contained in said outer retort and having means whereby it may be lifted out of said outer retort, and a distillate pipe disposed above the furnace roof and leading from said outer retort.

LEO STRELKA.